J. MATOFIJ.
PLOW.
APPLICATION FILED JULY 1, 1915.
1,167,912.
Patented Jan. 11, 1916.
2 SHEETS—SHEET 2.
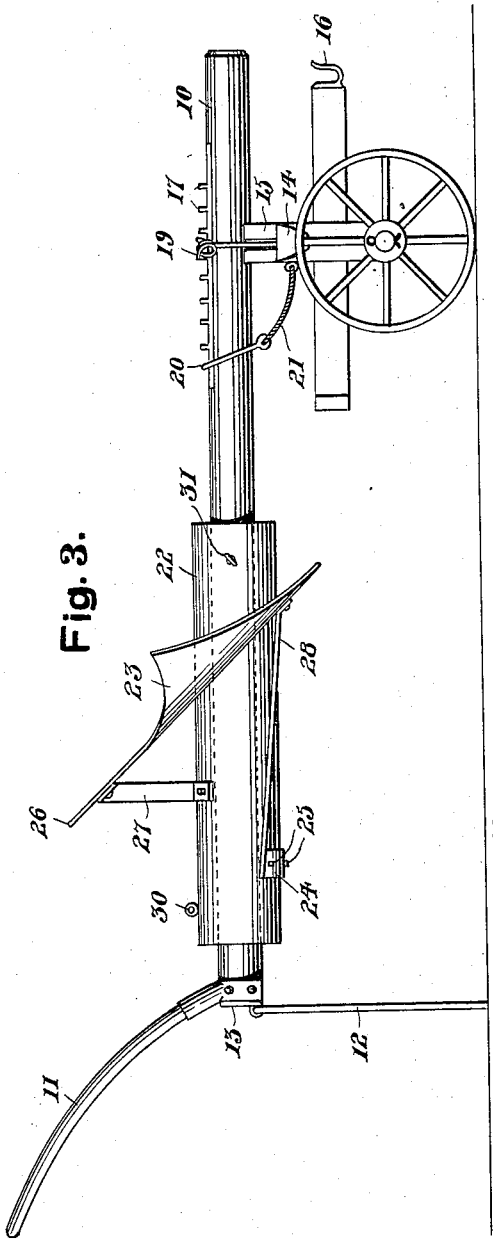
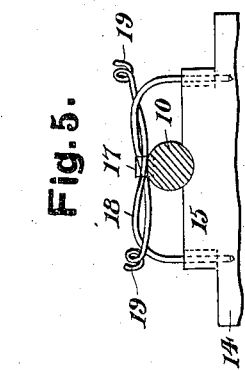
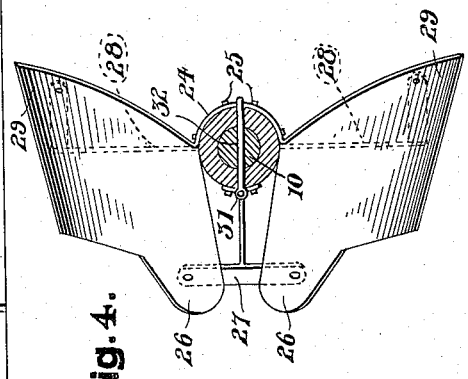
Inventor
J. Matofij
By A. M. Wilson.
Attorney

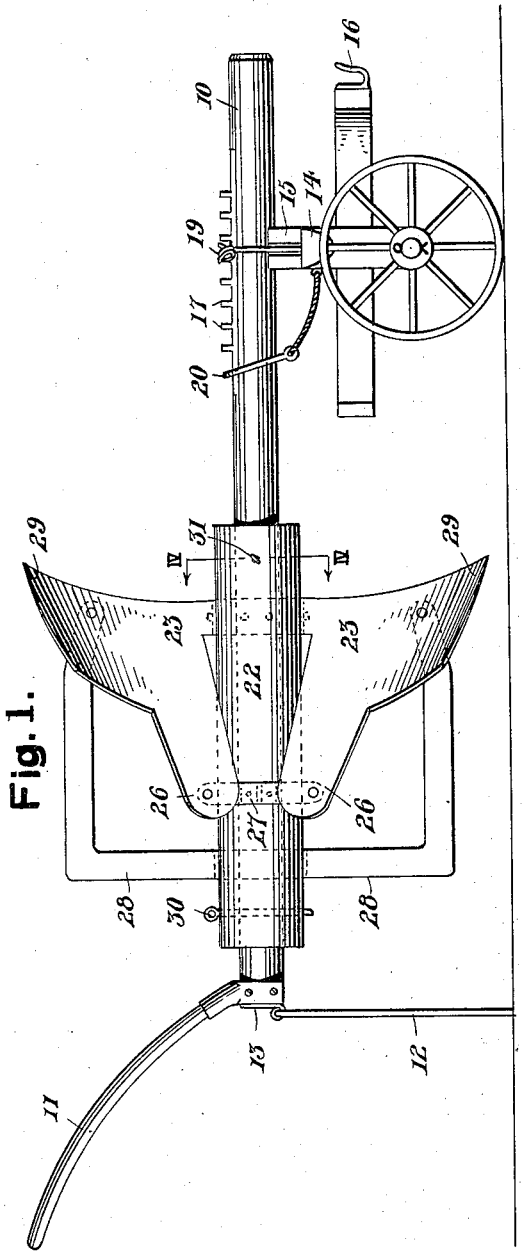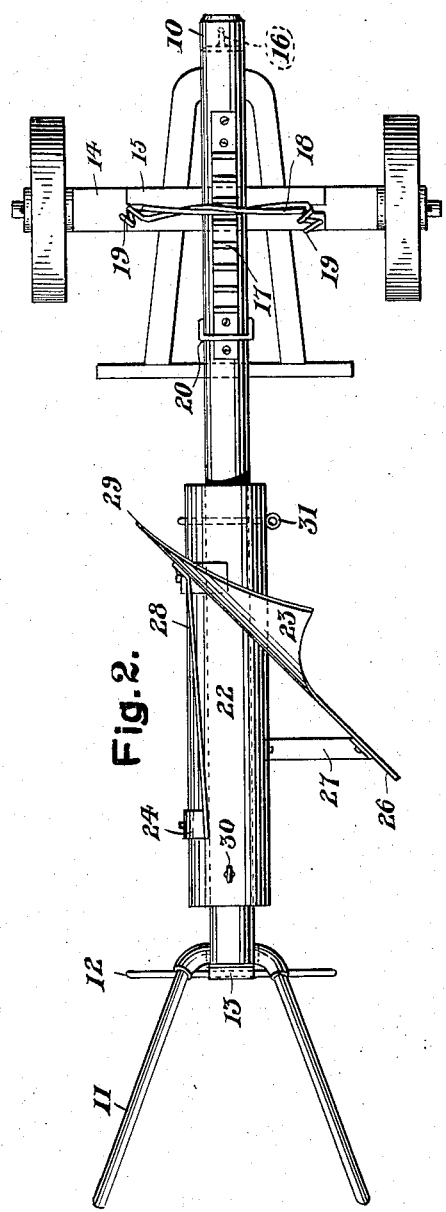

UNITED STATES PATENT OFFICE.

JOHN MATOFIJ, OF KATO, PENNSYLVANIA.

PLOW.

1,167,912.          Specification of Letters Patent.      Patented Jan. 11, 1916.

Application filed July 1, 1915. Serial No. 37,490.

*To all whom it may concern:*

Be it known that I, JOHN MATOFIJ, subject of the Emperor of Austria-Hungary, residing at Kato, in the county of Center and State of Pennsylvania, have invented certain new and useful Improvements in Plows, of which the following is a specification.

This invention relates to certain new and useful improvements in plows.

The primary object of this invention is to provide a plow of simple construction adapted for ready adjustment to either its inoperative or operative positions and capable of shifting for cutting furrows at either side desired.

A further object is the provision of a plow having a double mold board readily shiftable for use in turning a furrow in either desired direction and being further shiftable to an elevated inoperative position when desired.

A still further object is the provision of a plow having a longitudinally adjustable mounting means for a reversible and adjustable ground-engaging member and whereby greater efficiency is imparted to the operation of the device.

With these general objects in view and others that will appear as the nature of the invention is better understood, the same consists in the novel combination and arrangement of parts to be hereinafter more fully described, illustrated in the accompanying drawings, and pointed out in the appended claim.

In the drawings forming a part of this application and in which like-designating characters refer to corresponding parts throughout the several views, Figure 1 is a side elevation of the plow with one mold board operatively positioned but arranged elevated above the ground. Fig. 2 is a top plan view thereof. Fig. 3 is a view similar to Fig. 1, but with the mold boards inoperatively positioned. Fig. 4 is a vertical sectional view taken upon line IV—IV of Fig. 1, and Fig. 5 is a detail sectional view of the resilient retaining means for the plow beam.

Referring more in detail to the drawings, a substantially cylindrical plow beam 10 is illustrated having rearwardly projecting handles 11 secured at the rear end thereof and with a supporting bail 12 swingingly carried by a bracket 13 secured to the rear end of the said beam and constituting rear legs for the plow.

A wheel carriage 14 is arranged for the forward end of the plow beam and has a block 15 mounted thereon and upon which the forward end portion of the beam 10 rests, while the plow is adapted to be impelled forwardly by any desired motor means which may be attached to the hook 16 forwardly carried by the carriage.

A rack 17 is longitudinally positioned upon the beam 10 and the teeth thereof are adapted to be engaged by a resilient clamp carried by the block 15 and being in the form of oppositely extending resilient arms 18 terminating in helical ends 19 constituting engaging handles and by means of which the said arms may be readily swung upwardly for adjusting the same in contact with the desired portion of the rack 17 for positioning the beam in its desired adjusted position. A further anchoring means is provided for the beam 10 consisting of a metallic loop 20 encircling the beam 10 and adjustable to any desired position upon the rack 17 and being connected to the carriage 14 by means of a flexible connector 21. A tubular mounting means or barrel 22 is rotatively journaled upon the plow beam 10 and is provided with oppositely arranged mold boards 23 carried thereby and in the form of a double mold board connected together by means of a yoke 24 secured to the barrel 22 by hold-fast devices 25, while the rear reduced ends 26 of the boards 23 are rigidly connected to said barrel by means of a suitable bracket 27, it being also noted that angular braces 28 connect the forward ground-engaging pointed portions 29 of the boards with the said barrel.

From this description of the device, it will be seen that either of the opposite mold boards may be operatively positioned so as to engage its pointed portion 29 with the earth for turning a furrow and such adjustment is accomplished by releasing transverse pins 30 and 31 carried respectively at the rear and forward ends of the barrel 22 and removably extending axially through the barrel, and perforations 32 arranged through the beam 10, one of the same being illustrated in Fig. 4. As the mold boards 23 are oppositely curved away from the supporting barrel 22, the same are adapted to turn furrows in opposite directions whenever the desired one of the same is operatively positioned beneath the barrel, while both of the mold boards may be inoperatively positioned substantially up-side-down as best illustrated in Fig. 3 when desired to propel the device along in its free inoperative position. While the rear portion of the plow beam and mold boards is held elevated by means of the rear legs 12 when desired, it will be seen that by imparting a forward movement to the plow, the legs 12 will be pivotally moved rearwardly for allowing the mold boards to operatively enter the earth in plowing the desired furrow, while the plow shares 11 are utilized in directing and guiding the mold board during the plowing operation, and while the motor attached to the carriage hook 16 propels the plow over the field, the depth of the furrow is governed by longitudinally adjusting the beam 10 upon the carriage 14 as well as by manipulating the plow shares 11.

While the form of the invention herein shown and described is what is believed to be the preferred embodiment thereof, it is nevertheless to be understood that minor changes may be made without departing from the spirit and scope of the invention as claimed.

What I claim as new is:—

A plow comprising a supporting beam, a forwardly arranged wheel carriage adapted to support said beam, a rack bar carried by the upper face of the beam adjacent the carriage, oppositely-extending resilient arms carried by the carriage for engagement with said rack bar, handles carried by the ends of the resilient arms flexible connecting means between the carriage and rack bar, a relatively long barrel journaled upon the said beam, releasable retaining means for the said barrel, and oppositely arranged reversely operating mold boards secured to the said barrel.

In testimony whereof I affix my signature.

JOHN MATOFIJ.

Witnesses:
 ROBERT COOPER,
 GEO. MATTEE.

Copies of this patent may be obtained for five cents each, by addressing the "Commissioner of Patents, Washington, D. C."